Feb. 13, 1923.
C. C. WOOD.
RIM FOR PNEUMATIC OR SOLID TIRES.
FILED DEC. 5, 1921.
1,445,466.
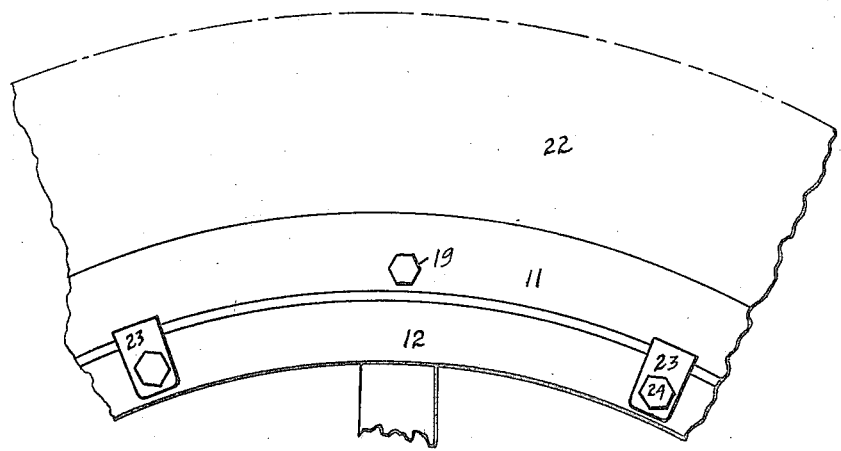
Fig. 1
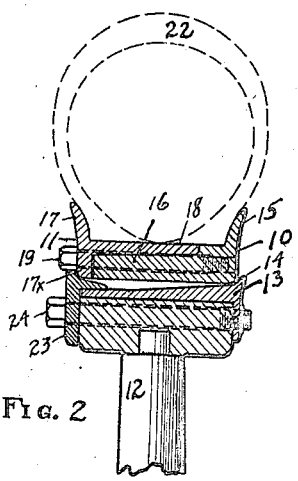
Fig. 2
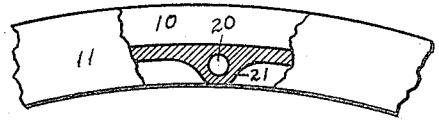
Fig. 3,
INVENTOR.
Charles C. Wood
BY
*U. S. Charles*
ATTORNEY.

Patented Feb. 13, 1923.

1,445,466

UNITED STATES PATENT OFFICE.

CHARLES C. WOOD, OF WICHITA, KANSAS.

RIM FOR PNEUMATIC OR SOLID TIRES.

Application filed December 5, 1921. Serial No. 520,096.

*To all whom it may concern:*

Be it known that I, CHARLES C. WOOD, a citizen of the United States, residing at Wichita, in the county of Sedgwick and State of Kansas, have invented certain new and useful Improvements in Rims for Pneumatic or Solid Tires, of which the following is a description, referring to the drawings which accompany this specification.

The invention relates to an improvement in rims of the type employed for attaching tire casings to automobile wheels.

In the drawings, Fig. 1 is a side view of a fragmentary portion of my improved rim as mounted upon an automobile wheel, employing a demountable rim. Fig. 2 is a sectional view of Fig. 1. Fig. 3 is a side view of my rim seen in Fig. 1 with a part in section to disclose constructional features of the device. Similar numerals of reference indicate corresponding parts throughout all the figures of the drawings.

In mounting a tire casing in a demountable rim, it has previously been necessary to decrease its diameter sufficiently to allow the casing to slip over the flange thereof. Most demountable rims are of a single piece of sheet metal rolled ring-like with the ends brought to a membering relationship. This permits of a reduction in diameter for mounting the casing as is well understood in the art. When the casing was in position, the rim was then expanded to its normal size. It frequently happened that this was difficult to accomplish, especially when the mechanic was not supplied with the necessary tools and accordingly, the rim was beaten with a hammer and pried, forced or twisted until eventually it became misshapen and worthless. By means of my invention, this trouble is entirely obviated and a rim is provided that is very substantial and one upon which a casing can be readily mounted. In my invention, as will be later disclosed, two ring-like elements, each having a flange along its outer edge portion also have band-like elements, each integral with its flange element on its own section; one band element of one section extends towards and in the combination entirely supports the band element of the other ring element, since the band element of the first section is of the full width necessary to reach quite across the felly band on the wheel itself; and this first section also carries on its inner face, at spaced intervals, enlarged threaded portions which likewise are of the full width of the felly band. These enlarged portions, as will be later shown, register with openings oppositely positioned in the flange of the other section and accommodate securing bolt elements and whereby the combination is effected.

Referring to the drawings, my improved rim comprises two ring-like members 10 and 11 which as shown in Figs. 1 and 2 are in combination upon an automobile wheel 12 arranged for a demountable rim, being provided with the tapering steel flanged felly band 13 as disclosed. The member 10 is preferably fabricated as a hoop or band whose inner diameter is of a size to pass the tapering felly band 13 to a contact with the flange 14 thereof. The member 10 is provided with a laterally and outwardly extending flange member 15 along one edge thereof and of proper size and shape to accommodate either a straight side or clincher tire casing; the opposite side 16 of the member 10 constitutes a band portion and tapers outwardly as disclosed in Fig. 2.

The member 11 is provided with a flange 17 similar to the flange 15 and this in the assembly bears against the opposite bead of the tire casing as disclosed, while the opposite side 18 of the member 11, larger in diameter than the corresponding portion 16 of the member 10 is likewise outwardly tapered.

It will be noted that a flange 17× is inwardly arranged from the member 18 and on the side opposite the flange 17 and at spaced distances, holes are provided through which bolts 19 are passed which pass also through holes such as 20, transversely arranged through enlarged portions 21 of the member 10 and into which they screw.

To mount a tire casing 22 upon the wheel 12, Figs. 1 and 2 the member 10 is brought into position from one side with its flange 15 contacting the bead of the casing, then the member 11 is brought into position from the opposite side of the casing with its tapering section arranged intermediate the casing and the tapering section of the member 10. The several bolts 19 are then inserted through the registering holes 20 and screwed up, thereby rigidly clamping the members 10 and 11 together in which position they support the tire casing. The assemblage is then slipped over the tapering felly band 13 and the customary rim retaining lugs 23 when set by the bolts 24 maintain the assemblage upon the wheel 12.

To remove the casing, it is merely necessary to remove the lugs 23 and the bolts 19, then the member 11 is withdrawn. Sometimes the casing will remain on the member 11 and sometimes on the member 10, whichever is the case, the casing is then lifted from the retained ring member.

The tapering or angular formation of the parts 16 and 18 enables the clamping bolts 19 to draw the parts to a close and tight fit, whence they act as a unit.

Such modifications may be employed as lie within the scope of the appended claim.

Having fully described my invention what I now claim as new and desire to secure by Letters Patent is:

In a rim of the class described; two ring-like elements, the first element having a flange as an outer edge portion and a band-like tapering section integral therewith; the second element likewise having a flange as an outer edge portion and a band-like tapering section integral therewith and of larger diameter than the first mentioned band-like section and upon which it is arrangeable in combination; the first element having a plurality of enlarged portions, integral therewith, arranged transversely thereto at spaced distances apart on the inner side of its band section, each enlarged portion having a bolt receiving hole axially aligned therein and threaded at its inner portion; the flange of the second element extending from both sides of its band section and bolt receiving holes therein and bolts, one for each bolt receiving hole registering with the bolt receiving holes of the enlarged transverse portions of the first element for the purposes substantially as specified.

CHARLES C. WOOD.

Witnesses:
M. Y. CHARLES,
W. A. NETHERCOT.